United States Patent [19]

Kober

[11] 4,064,581

[45] Dec. 27, 1977

[54] WIRE STRIP, WRAP AND UNWRAP TOOL

[75] Inventor: Marvin Kober, Spring Valley, N.Y.

[73] Assignee: O.K. Machine and Tool Corporation, New York, N.Y.

[21] Appl. No.: 679,519

[22] Filed: Apr. 23, 1976

[51] Int. Cl.[2] .......... H02G 1/12

[52] U.S. Cl. .......... 7/14.1 R; 242/7.17; 140/122; 29/764

[58] Field of Search .......... 7/14.1 R, 1 R; 140/124, 140/122, 119; 29/203 H, 764; 242/7.06, 7.17, 7.18

[56] References Cited

U.S. PATENT DOCUMENTS

| | | | |
|---|---|---|---|
| 2,585,010 | 2/1952 | Hickman et al. | 140/122 |
| 2,688,449 | 9/1954 | Haagensen | 140/122 |
| 2,848,914 | 8/1958 | Gottfried | 7/14.1 R |
| 2,898,952 | 8/1959 | Lovecky | 140/124 |
| 3,095,913 | 7/1963 | Shepherd et al. | 29/764 |
| 3,378,906 | 4/1968 | Dorsey | 140/124 |

FOREIGN PATENT DOCUMENTS

| | | | |
|---|---|---|---|
| 613,492 | 1/1961 | Canada | 242/7.17 |
| 578,611 | 6/1959 | United Kingdom | 140/124 |

*Primary Examiner*—James L. Jones, Jr.
*Assistant Examiner*—Roscoe V. Parker

[57] ABSTRACT

An electrical tool, especially for hand use, which can function to strip the insulation from electrical wire, wrap the stripped end about a terminal, and unwrap the stripped end to remove the wire from the terminal is described. The wrapping and unwrapping bits extend from opposite ends of a common handle, on which the stripper is mounted. Features include novel wrapping and unwrapping bits, and the stripper construction.

9 Claims, 8 Drawing Figures

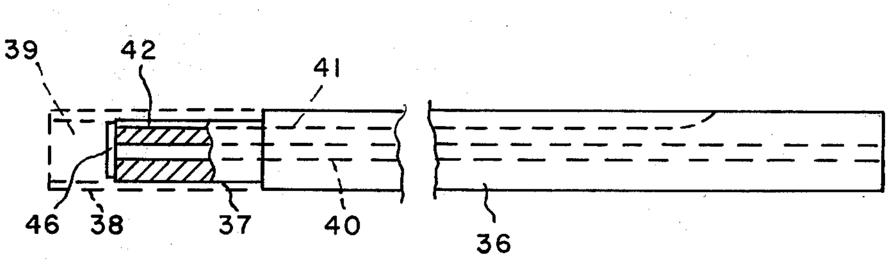
FIG. 6
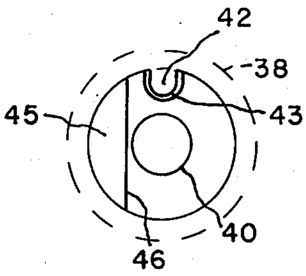
FIG. 7
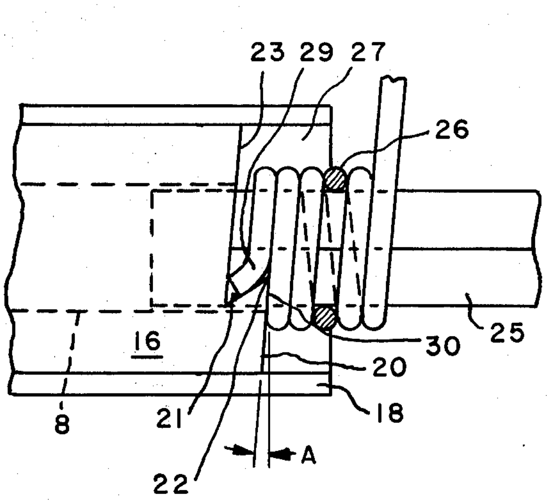
FIG. 5
FIG. 8
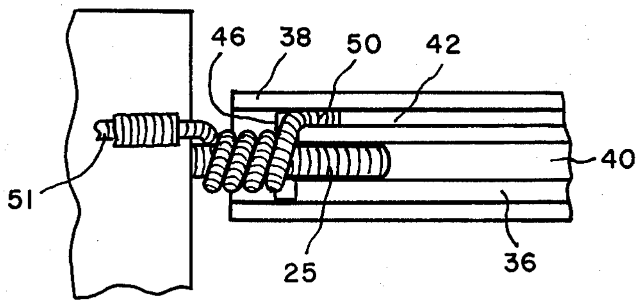

WIRE STRIP, WRAP AND UNWRAP TOOL

This invention relates to tools for stripping the end of electrical wire, for wrapping the stripped end about an electrical terminal, and for unwrapping the wrapped wire end, and more particularly, though not exclusively, to a hand tool combining the three stripping, wrapping, and unwrapping functions in a unitary tool construction.

Wire wrapping tools for wrapping wire about electrical terminals for making wrapped wire connections are known. Separate strippers are also known for stripping the insulation off of the end of insulated electrical wire. Hand and power tools are also known that combine the stripping and wrapping functions; however, such tools are quite expensive to manufacture.

Hand tools are also known that combine with the wrapping function additional structure to unwrap the wrapped wire end when it is desired to remove the wire from the terminal. In one known tool, the unwrap structure is incorporated in the wrapping bit face. In another known tool, a separate bit is provided to supply the unwrap function. Such tools, too, are relatively expensive.

There has been for some time a need in the art for inexpensive hand tools for carrying out the functions of stripping, wrapping and unwrapping of fine electrical wire for interconnecting small electrical components. For instance, in industry, there is a practice in the fabrication of prototype circuits to assemble the electrical components on a circuit board and interconnect them by means of wrapped wire connections to terminals mounted on the board. Wire wrapping is preferred because a thin wrapping tool can often access closely spaced terminals more easily than a soldering iron, successive connections can be made to the same terminal without fear of spoiling a prior connection, no harmful effects due to soldering iron heat or solder splatter are encountered, and the wrapped connections are readily removed when desired. For similar reasons, using wire wrapped connections in place of soldered wire connections has become popular among electronic hobbyists and do-it-yourselfers. The tools currently available for such practitioners are costly, and so far as is known, do not combine the three essential stripping, wrapping and unwrapping functions into a single unitary tool construction.

An object of the invention is a single tool which combines the three functions of stripping, wrapping and unwrapping electrical wire.

Another object of the invention is a new and improved hand tool capable of stripping, wrapping and unwrapping wire and characterized by simplicity and low manufacturing cost.

A further object of the invention is a new and improved wire wrapping bit for use in tools for making wrapped wire connections.

Yet another object of the invention is a new and improved wire unwrapping bit for use in tools for unwrapping wire connections.

These and other objects of the invention are achieved, briefly speaking, with a unitary hand tool characterized by a handle portion having mounted at one end a wire wrapping bit, at the opposite end a wire unwrapping bit, and on the handle a stripper for insulated wire, the three being configured to perform their respective functions on the same electrical wire size.

Among the features of the invention are a novel wrapping bit capable of making tightly wrapped, fine-wire connections, characterized by a bit face defining a bore for receiving the terminal and a hole for receiving the end of the wire to be wrapped around the terminal and enclosed by a sleeve fixedly secured to the bit, and further characterized by simplicity and capable of low cost manufacture. In a preferred arrangement, the bit face is provided with a single wall offset to the bit axis.

Still another feature is a novel unwrapping bit characterized by a surface oriented at an angle substantially corresponding or parallel to that of the face of the wrapped wire end to form a knife edge, which orientation facilitates insertion of the knife edge under the first wrapped coil thereby improving the unwrapping function.

Still a further feature of the invention is the construction and mounting of the stripper and its relation to the handle and the unwrapping bit.

These and other features and advantages of the invention will be better understood from the following detailed description of a preferred embodiment in accordance with the invention, taken in conjunction with the accompanying drawings, wherein:

FIG. 5 is a side view illustrating operation of the unwrapping bit of the tool of FIG. 1;

FIG. 6 is an enlarged detail view of the wrapping bit of the tool of FIG. 1;

FIG. 7 is a further enlarged end view of the wrapping bit shown in FIG. 6;

FIG. 8 is a view illustrating operation of the wrapping bit of the tool of FIG. 1.

Figures 1, 2, 3, 4:
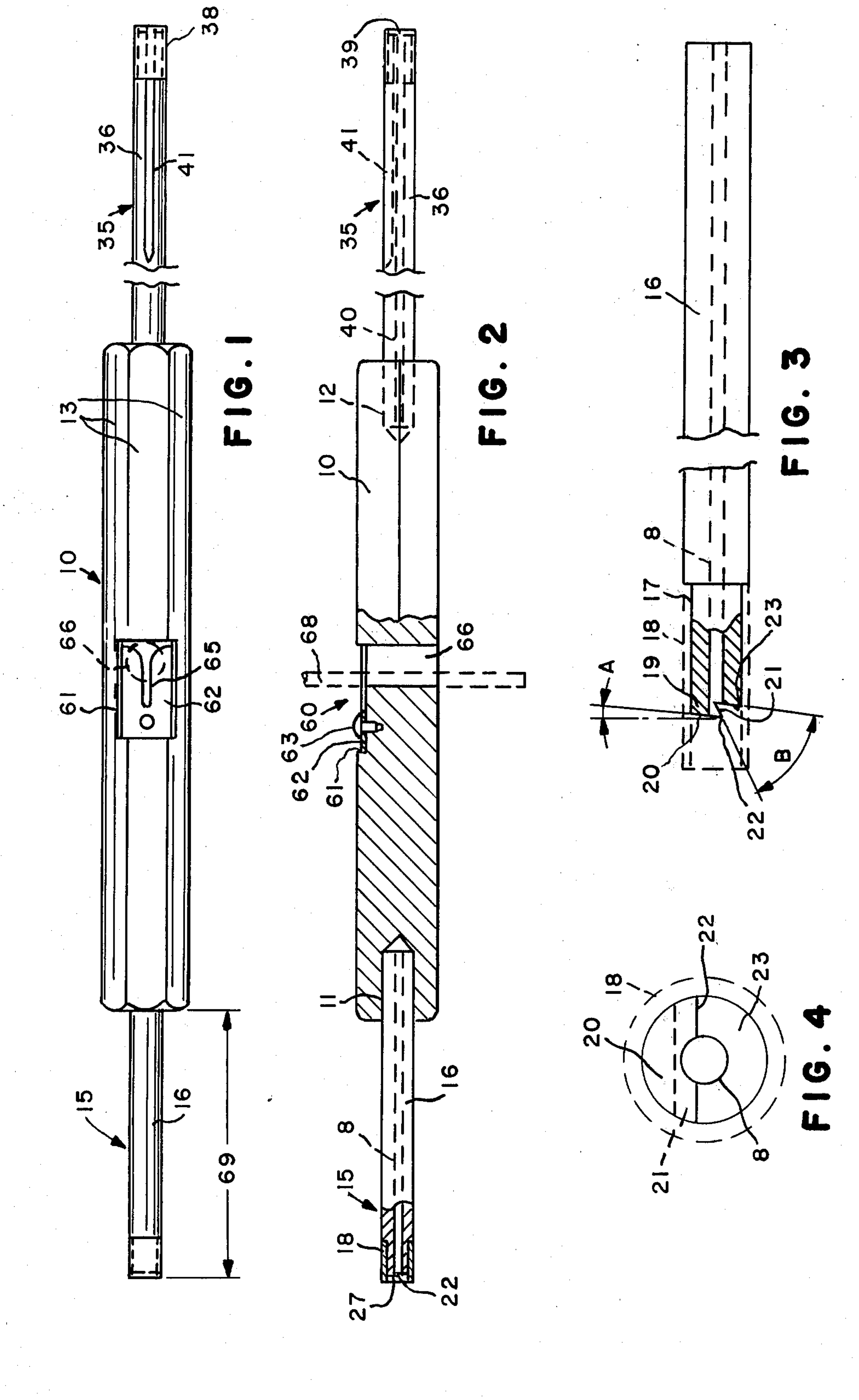
FIG. 1 is a plan view of a preferred form of tool in accordance with the invention.
FIG. 2 is a side, partly cross-sectional view of the tool of FIG. 1 shown with a wire inserted ready to be stripped.
FIG. 3 is an enlarged detail view of part of the unwrapping bit of the tool of FIG. 1.
FIG. 4 is a further enlarged end view of the unwrapping bit shown in FIG. 3.

As shown in FIGS. 1 and 2, the tool of the invention in its preferred embodiment is a hand tool comprising a central handle 10 in the form of a straight, generally cylindrical member of suitable material, as for example metal or plastic, aluminum being preferred for its low weight and easy machinability. Axial bores 11, 12 are provided at opposite ends of the handle 10. The handle 10 is provided with flat sides 13. A hexagonal cross-section is preferred as illustrated, though other configurations are also suitable.

Secured in the left-hand bore 11 is a wire unwrapping bit 15 comprising an elongated cylindrical shaft 16 having a central bore 8, the remote end of which shaft is provided with structure capable of unwrapping a wrapped wire from a terminal. The unwrapping structure comprises a recessed area formed by a reduced diameter end 17 of the shaft 16 on which is secured in fixed position in any suitable manner a sleeve 18 which projects a short distance beyond the shaft end. The shaft end is machined to form a projecting land 19 having surfaces 20 and 21 forming a knife edge 22 offset from the axis of the shaft 16. As illustrated in FIG. 3, one of the knife edge surfaces 20 is oriented at an angle A with respect to a plane perpendicular to the shaft axis, and the other knife edge surface 21 is oriented at an angle B with respect to a lower surface 23 of the face which extends parallel to knife edge surface 20. The angles A and B are chosen as follows. Angle A is selected so that knife edge surface 20 extends substantially parallel to the orientation of the surface it is to engage at the surface of the wrapped wire conductor. Thus, angle A depends upon the manner in which the wrapped wire connection is made. For use in conjunction with the wrapping bit of the tool of the invention, angle A is preferably chosen to be about 6°–9°. Angle B is then selected to provide a reasonably sharp, sturdy knife edge, and preferably is in the range of about 50°–70°.

The manner in which the unwrapping tool operates to achieve its intended function is illustrated in FIG. 5, which shows at 25 a typical terminal, which is usually square or rectangular in cross-section, on which is formed a wrapped wire conductor 26. In operation, the user grasps the handle 10 of the tool and pushes the unwrap bit 15 onto the terminal 25 which enters the bore 8. As will be noted, the bore 8 is dimensioned to receive the terminal 25, but not the wrapped wire conductor 26. The recessed area 27 at the end will however accommodate both. The tool is stopped when the bit face engages the wrapped wire. The user then rotates the tool (counter clockwise in FIG. 5 for a clockwise wrapped wire). When the knife edge 22 engages the wire end 29, due to the corresponding orientations of the knife edge surface 20 and the facing surface 30 of the wire coil, insertion of the knife edge 22 under the wire end 29 is facilitated. As the tool rotates, the wire end is separated as shown from the terminal, and continued rotation loosens the entire wrapped connection, after which the tool can be removed and the wire connection readily withdrawn by hand from the terminal.

Secured in the right-hand bore 12 (see FIGS. 1 and 2) is a wire-wrapping bit 35 in accordance with the invention, comprising a shaft 36 on whose remote end is provided structure capable of performing the wire wrapping function. This structure includes as in the unwrapping bit 15, a reduced diameter shaft end 37 (see also FIGS. 6 and 7) on which is secured by any suitable means a fixed sleeve 38 forming a recessed space 39. The shaft end has an axial central bore 40 which is dimensioned to receive the wire terminal. An axially extending groove 41 is formed along the shaft surface, enclosed at its forward end by the sleeve 38 to form a hole 42 dimensioned to receive the bare wire conductor. Both the bore 40 and hole 42 are located within the enclosed recessed space 39. The hole edge is rounded at 43 to avoid damaging the wire as it is pulled from the hole over the hole edge during the wrapping operation. The face of the shaft end, the bit face, is flat except for a forwardly projecting flat land 45 forming a wall 46 which lies in a plane extending substantially parallel to the bore axis but offset therefrom so as to lie adjacent the bore 40 edge. The wall 46 extends across the entire bit face and is readily formed by simply milling across the shaft end before the sleeve 38 is assembled.

Operation of the wrapping bit is similar to that of other known manual wrapping bits. See FIG. 8. The user inserts the stripped end 50 of the wire into the hole 42, then, grasping the handle 10, pushes the wrapping bit 35 onto the terminal 25 which enters the bore 40. Then, the tool is rotated (clockwise in FIG. 8) while the user grasps the remaining wire at the end designated 51, extending same transverse to the projecting terminal 25. As the tool wraps the fixedly-held wire around the terminal, the wire end 50 is pulled out of the hole 42. When the end finally emerges, the wall 46 engages the free end and wraps the end of the last turn of the wire close against the terminal side, producing the coil configuration of FIG. 5. The sleeve 38, which is fixed to and rotates with the shaft 36, and which is dimensioned to receive and enclose the wrapped wire terminal, assures that the coil wraps around the terminal, rather than around the bit itself, that the turns do not overlap one another, and guides the wire in its helical path as it exits from the hole and coils around the terminal. The wrapping action thus takes place within and controlled by the fixed sleeve 38.

For this purpose, the sleeve 38 projects forwardly from the bit face, completely enclosing both the terminal 40 bore and wire hole 42. The sleeve should extend forwardly beyond the bit face a distance at least equal to the thickness of the insulated wire and preferably 1–2 times that thickness. In a preferred example, for a wire thickness of 0.012 inches, the sleeve end was spaced from the end of the wall 46 by a distance of about 0.015 inches.

The wire stripping function is provided by a stripper 60 mounted on the handle 10. In a preferred form, a generally retangular recessed area 61 is formed as by milling in one of the flat sides of the handle 10 for receiving a thin bifurcated stripping blade 62 also of generally rectangular shape. The stripping blade 62 is secured to the handle as for example by a pin 63 press-fitted into a hole formed in the handle. The embeding of the rectangular stripping blade 62 in the recess 61 confined between two raised areas prevents rotation of the blade and locates the blade at or below the handle surface. This prevents damaging of the stripping slot should the tool be thrown onto a table or when the handle is supported in a vise, as will be later explained. The blade 62, which is of thin flat spring metal, contains a stripping slot 65 which widens at its end to afford access of the insulated wire. The blade 62 may be of the three-part sandwich construction described in U.S. Pat. No. 3,881,248, or may be formed from a single plate as illustrated, corresponding to the inner plate of the patented construction. The slot 65 sides, where parallel, are spaced to accommodate the diameter of the bare wire, but not the covering insulation. A bore 66 extends completely through the handle 10, transverse to its longitudinal axis, and is located under the stripping slot 65 as illustrated. In operation, the user inserts the wire end 68 (see FIG. 2) to be stripped through the widened end of the slot 65 and through the handle bore 66, and then pushes the wire down into the slot 65 where it narrows. Due to the dimensioning, the slot edges cut through the insulation on opposite sides of the wire. Pulling the wire upward in FIG. 2 will strip the cut insulation from the wire end, which will then drop out the bore bottom. For certain kinds of insulation which adhere more tightly to the wire, it may be desirable to rotate the tool or the wire in order to cut the insulation around its full circumference. During the stripping operation, the stripper is preferably positioned vertically with the upwrapping bit end steadied by being held against a supporting surface such as a table top. The stripper blade is oriented for the tool to be used in this way. The projecting sleeve 18 protects the unwrapping bit knife edge 22 against damage. Alternatively, the tool may be mounted vertically in a vise by means of its handle 10, the flat sides facilitating this use of the tool. The flat handle sides also prevent rolling of the tool when placed on a flat surface.

The experience of the user will generally determine the length of the wire end to be stripped. To ensure similar lengths or a desired length, typically $\frac{3}{4}$ to 1 inch, the tool can be proportioned to provide a suitable standard. For example, the unwrapping bit 16 can be dimensioned to project from the handle 10 a distance equal to the desired $\frac{3}{4}$ inch, indicated in FIG. 1 at 69. As an alternative, suitable indicia can be marked on the handle surface as a convenient means for measuring the stripped wire length. Although the stripper mounting arrangement described is preferred, it will be understood that other mounting arrangements enabling the stripping function to be satisfactorily performed are also within the contemplation of the invention.

In the construction of the tool of the invention, the wrapping bit and unwrapping bit shafts 36, 16 can be secured in their respective bores 12, 11 in the handle by any suitable means, such as by a press-fit or a suitable adhesive. The sleeves 38, 18 can be fixedly secured on their respective shafts 36, 16 by similar means.

To illustrate the small size of the preferred embodiment of the invention, for use with #30 AWG wire, the total tool length was $4\frac{1}{2}$ inches, with a handle thickness of 5/16 inches. The unwrapping bit and wrapping bit projected from the handle ends $\frac{3}{4}$ and $1\frac{1}{4}$ inches respectively, and their diameter was $\frac{1}{8}$ inches.

It will be clear from the foregoing that the tool of the invention offers a number of advantages over the prior art tools. These can be summarized as follows:

1. A simple, low-cost construction,
2. Combining into a single tool the three functions needed by the technician or hobbyist to construct electronic circuits,
3. An easily handled and easily operated tool that efficiently carries out the stripping, wrapping and unwrapping functions,
4. A wrapping bit which, though of simple, low-cost construction, forms satisfactory wrapped wire connections,
5. An unwrapping bit that affords improved unwrapping action,
6. A stripper construction which is convenient to use yet is protected by its mounting against damage due to mishandling of the tool and also will prevent injury to the user during handling.

The tool of the invention is especially useful for working with fine electrical solid wire of the type used for making connections between small electronic components such as integrated circuits, or in telecommunication equipment, typical wires sizes being #22–30.

While the novel wrapping and unwrapping bit configurations illustrated are preferred for use in the combined three-function tool because of their low manufacturing cost and satisfactory performance, it will be understood that the principles underlying this feature of the invention, of combining in a single efficient tool the structure for realizing for the same wire size the three functions of stripping, wrapping and unwrapping essential for the technician or hobbyist to construct electronic circuits, can also be achieved with other dimensions or configurations of the wrapping and unwrapping bit faces which are already known in the art.

Furthermore, although the tool of the invention has been described in its preferred embodiment as being a manually operated hand tool, it is within the contemplation of the invention that the novel wrapping and unwrapping bits are each separately readily adaptable to be driven by a power tool of the electric or pneumatic known gun type. For this purpose, the bit shafts, separated from the handle, would have to be appropriately configured or adapted, as is well known, to fit into the known power tools. Still further, the bit faces can be readily changed to accommodate other shapes of terminals, and their dimensions scaled upward or downward for use with larger or smaller wire sizes, respectively.

It is further noted that the terminal-receiving bore 40 of the wrapping bit, and the terminal-receiving bore 8 of the unwrapping bit are both located along the axis of their respective shafts. This offers the advantage of further reducing manufacturing cost by allowing the use of less expensive tubing for solid rods that would require holes bored in their ends.

It is further noted that the construction described for the wrapping bit, with the wire-receiving hole 42 dimensioned to receive the bare wire, produces a normal wrapped connection. Modified wrapped connections (where the first turn or turns are of the insulated wire) can also be made by enlarging the initial part of the hole 42 to accommodate the insulated wire. This is readily accomplished by replacing the part of the groove 41 under the sleeve 38 with an enlarged second bore dimensioned to receive the insulated wire.

While my invention has been described in connection with specific embodiments thereof, those skilled in the art will recognize that various modifications are possible within the principles enunciated herein and thus the present invention is not to be limited to the specific embodiments disclosed.

What is claimed is:

1. A tool for stripping insulation from a wire end, for making a wrapped wire connection to an electrical terminal, and for unwrapping a wrapped wire connection, comprising a handle portion, a wrapping bit extending from one end of the handle and comprising an elongated shaft provided at one end with a recessed structure including an end face having a central terminal-receiving bore and, offset and spaced from the bore, means providing a hole substantially parallel to the bore for receiving the straight wire end and further including means providing a single wall extending completely across said end face and having a wire-engaging surface extending in a plane which is substantially parallel to but offset from the shaft axis and adjacent the bore edge, an unwrapping bit extending from the opposite end of the handle and comprising an elongated shaft provided at one end with a recessed structure having a central terminal-receiving bore dimensioned to receive the bare terminal but not a wire-wrapped terminal and, adjacent said bore, structure providing a knife edge extending transversely completely across the shaft end and adapted to fit under the first wrapped wire coil and engage with a surface thereof the adjacent coil surface for unwrapping the coil upon rotation of the tool, said knife edge surface being oriented substantially parallel to the orientation of the said adjacent facing surface of the coil end, and stripper means for removing insulation from electrical wire and comprising opposed insulation-cutting edges forming a stripping slot dimensioned to receive the bare wire but cut through any insulation thereon, said handle having a through-aperture therein located between the wrapping bit and unwrapping bit, said stripper means being mounted on said handle over the through-aperture such that a wire when positioned in the stripper slot will extend through the handle aperture.

2. A tool as claimed in claim 1 wherein the wrapping and unwrapping bits and the stripping slot are dimensioned to perform their respective wrapping, unwrapping and stripping functions on the same wire size.

3. A tool as claimed in claim 2, wherein the recessed areas at the working ends of the wrapping and unwrapping bits are each formed by a sleeve fixedly mounted on their respective shaft ends, said sleeves each projecting forwardly beyond their respective shaft ends.

4. A tool as claimed in claim 2, wherein the handle has flat sides, and the stripper means comprises a flat bifurcated plate mounted in a recessed area formed at a handle flat side and intersecting the through-aperture.

5. A tool as claimed in claim 4, and further comprising the bores in the wrapping and unwrapping bits both being located along the central longitudinal axis of the tool.

6. A tool for unwrapping a wrapped wire connection, comprising an elongated shaft provided at one end with a recessed structure having a central terminal receiving bore dimensioned to receive the bare terminal but not a wirewrapped terminal and, adjacent the bore, structure providing a knife edge extending transversely across the entire end face and adapted to fit under the first wrapped wire coil and engage with a surface thereof the adjacent coil surface for unwrapping same upon rotation of the tool, said knife edge surface being oriented substantially parallel to the orientation of the facing surface of the coil end.

7. A tool for unwrapping a wrapped wire connection as claimed in claim 6, wherein a sleeve is fixedly mounted on a reduced diameter portion of the shaft end and projects forwardly beyond the end forming the said recessed structure.

8. A tool for unwrapping a wrapped wire connection as claimed in claim 7, wherein the said knife edge surface is oriented at an angle of about 6°–9° relative to a plane perpendicular to the longitudinal axis of the shaft.

9. A tool for unwrapping a wrapped wire connection as claimed in claim 8, wherein the said knife edge surface is a first surface, and the knife edge has a second surface oriented about 50°–70° relative to the first surface.

* * * * *